US011068672B2

(12) United States Patent
Uchimura et al.

(10) Patent No.: US 11,068,672 B2
(45) Date of Patent: Jul. 20, 2021

(54) WIRELESS TAG SYSTEM AND WIRELESS COMMUNICATION AREA SHAPING METHOD

(71) Applicant: NEC CORPORATION, Tokyo (JP)

(72) Inventors: Jun Uchimura, Tokyo (JP); Hiroshi Takahashi, Kawasaki (JP); Masato Watanabe, Kawasaki (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/963,753

(22) PCT Filed: Jan. 18, 2019

(86) PCT No.: PCT/JP2019/001455
§ 371 (c)(1),
(2) Date: Jul. 21, 2020

(87) PCT Pub. No.: WO2019/146521
PCT Pub. Date: Aug. 1, 2019

(65) Prior Publication Data
US 2020/0356737 A1    Nov. 12, 2020

(30) Foreign Application Priority Data
Jan. 25, 2018 (JP) .............................. JP2018-010967

(51) Int. Cl.
*G06K 7/10* (2006.01)
*G06K 19/07* (2006.01)
(52) U.S. Cl.
CPC ..... *G06K 7/10316* (2013.01); *G06K 19/0723* (2013.01)

(58) Field of Classification Search
CPC ....................... G06K 7/10316; G06K 19/0723
USPC ......................................................... 235/461
See application file for complete search history.

(56) References Cited

U.S. PATENT DOCUMENTS

| | | | |
|---|---|---|---|
| 2009/0179741 A1* | 7/2009 | Hoyt | H01Q 7/08 340/10.1 |
| 2016/0148025 A1* | 5/2016 | Ohashi | G01V 15/00 340/10.1 |
| 2018/0089475 A1* | 3/2018 | Hattori | G06K 19/0723 |
| 2018/0365542 A1* | 12/2018 | Kantor | G06Q 10/087 |
| 2019/0032159 A1* | 1/2019 | Einen | C13K 1/04 |
| 2019/0221914 A1* | 7/2019 | Kato | H01Q 9/30 |

FOREIGN PATENT DOCUMENTS

| | | |
|---|---|---|
| JP | 07-93491 A | 4/1995 |
| JP | 2009-152736 A | 7/2009 |
| JP | 2015-228135 A | 12/2015 |
| JP | 2016-172605 A | 9/2016 |

OTHER PUBLICATIONS

International Search Report for PCT/JP2019/001455, dated Mar. 5, 2019.

* cited by examiner

*Primary Examiner* — Allyson N Trail
(74) *Attorney, Agent, or Firm* — Sughrue Mion, PLLC

(57) ABSTRACT

A wireless tag system including a tag signal antenna configured to receive a tag signal transmitted from a wireless transmission tag; and a communication area shaping antenna configured to transmit a reception area shaping signal for narrowing an area in which the tag signal antenna can communicate with the wireless transmission tag.

4 Claims, 3 Drawing Sheets

WIRELESS TAG SYSTEM AND WIRELESS COMMUNICATION AREA SHAPING METHOD

CROSS REFERENCE TO RELATED APPLICATIONS

This application is a National Stage of International Application No. PCT/JP2019/001455 filed Jan. 18, 2019, claiming priority based on Japanese Patent Application No. 2018-010967 filed Jan. 25, 2018, the content of which is incorporated herein by reference.

TECHNICAL FIELD

The present invention relates to a wireless tag system and a wireless communication area shaping method.

BACKGROUND ART

An RFID (Radio Frequency Identifier) tag is attached to each product placed on a product shelf, with product management then being performed by reading signals from the RFID tags. As a related technique, Patent Document 1 discloses a technique for limiting the detection range of a signal transmitted from an RFID tag as described above.

CITATION LIST

Patent Literature

[Patent Document 1]
Japanese Unexamined Patent Application, First Publication No. 2015-228135

SUMMARY OF INVENTION

Problem to be Solved by the Invention

In the product management as described above, the reading device that reads signals transmitted from RFID tags is required to be able to receive the signal from the RFID tag attached to a desired product among a plurality of different products displayed adjacent to each other.

Accordingly, it is an object of the present invention to provide a wireless tag system and a wireless communication area shaping method that can solve the above-described problems.

Means for Solving the Problem

According to a first aspect of the present invention, a wireless tag system is characterized by being provided with a tag signal antenna configured to receive a tag signal transmitted from a wireless transmission tag; and a communication area shaping antenna configured to transmit a reception area shaping signal for narrowing an area in which the tag signal antenna can communicate with the wireless transmission tag.

According to a second aspect of the present invention, a wireless communication area shaping method is characterized by transmitting, by a communication area shaping antenna, a reception area shaping signal for narrowing an area in which a tag signal antenna can communicate with a wireless transmission tag; and receiving, by the tag signal antenna, a tag signal transmitted from wireless transmission tag positioned in the area.

Advantageous Effects of Invention

According to the present invention, it is possible to limit the receivable area of a reading device that reads signals transmitted from RFID tags.

DESCRIPTION OF EMBODIMENTS

Hereinbelow, a wireless tag system and a wireless communication area shaping method according to an embodiment of the present invention will be described with reference to the drawings.

Figure 1:
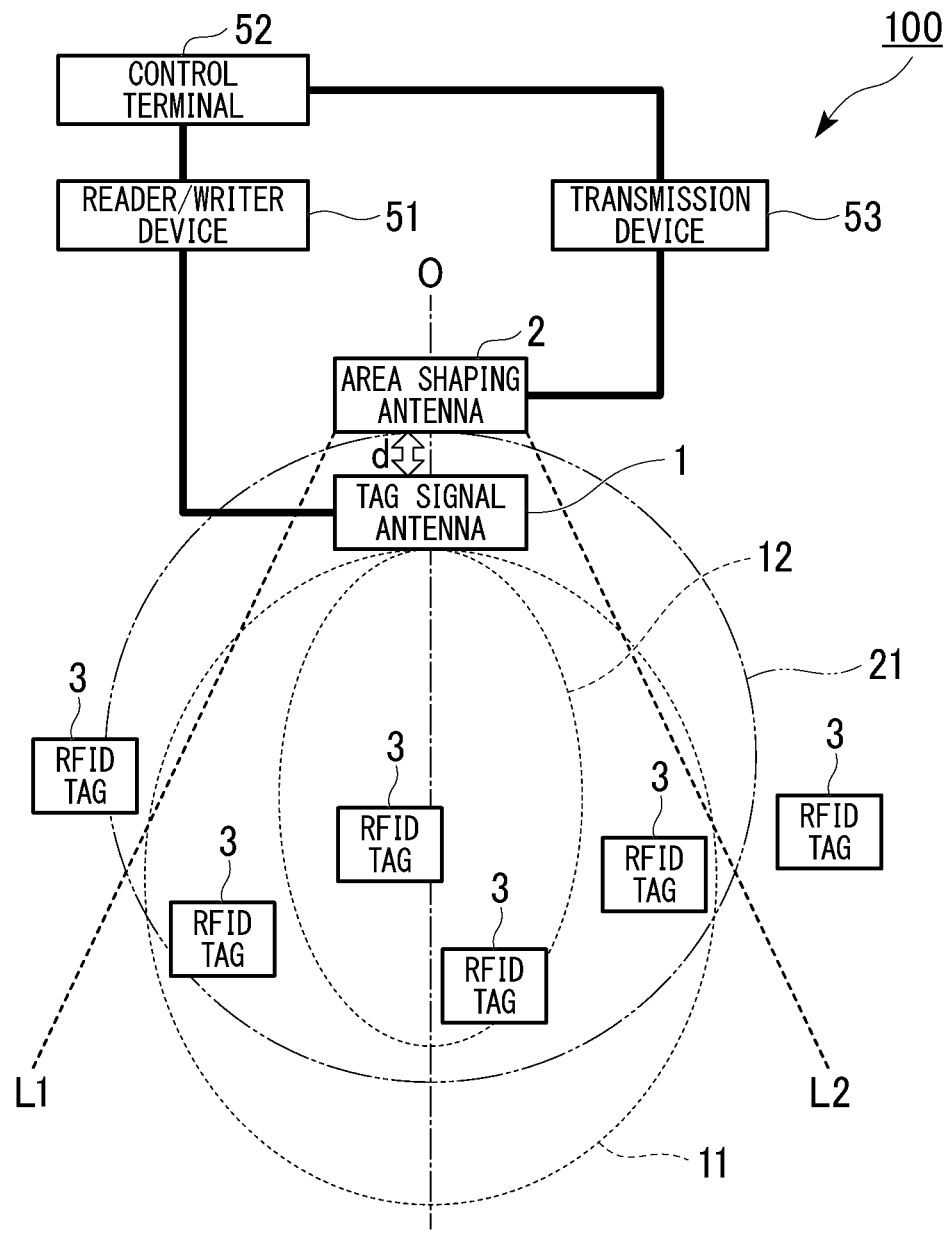
FIG. 1 is a first drawing illustrating a configuration of the wireless tag system according to one embodiment of the present invention.

FIG. 1 is a first drawing illustrating a configuration of the wireless tag system according to the embodiment.

As shown in this drawing, a wireless tag system 100 is provided with at least a tag signal antenna 1 and an area shaping antenna 2 (communication area shaping antenna).

The wireless tag system 100 is provided with a reader/writer device 51 communicatively connected to the tag signal antenna 1. The reader/writer device 51 reads information written on a RFID tag 3, which is one mode of a wireless transmission tag, and writes information to the RFID tag 3. The tag signal antenna 1 is an RFID antenna that, on the basis of control of the reader/writer device 51, transmits to the RFID tag 3 a trigger signal for triggering activation of the RFID tag 3.

The RFID tag 3 that has received the trigger signal, in one example, is activated by converting a magnetic field generated in a coil within the tag into an electrical signal on the basis of the trigger signal, and performs signal transmission/reception with the tag signal antenna 1. When the trigger signal indicates a write instruction, the RFID tag 3 writes information included in the signal into a storage unit. When the trigger signal indicates a reading instruction, the RFID tag 3 transmits a tag signal including stored information.

The reader/writer device 51 receives tag signals via the tag signal antenna 1 and reads information included in the signals. Further, the wireless tag system 100 is provided with a control terminal 52 for controlling the reader/writer device 51. In the RFID system constituted by the reader/writer device 51, the tag signal antenna 1, and the RFID tag 3, wireless communication is mutually performed using a wireless signal (trigger signal, tag signal) having a frequency in the 920 MHz band, for example. The RFID system uses, for example, the mirror subcarrier type RFID modulation method. In the RFID system, for example, radio signals in the same frequency band are used.

The wireless tag system 100 is also provided with a transmission device 53 that controls transmission of signals from the area shaping antenna 2. The area shaping antenna 2 is disposed on a side opposite to the RFID tag 3 with respect to the tag signal antenna 1. That is, the area shaping antenna 2 is located in a direction opposite to the direction in which the tag signal antenna 1 faces the RFID tag 3. In other words, with respect to the RFID tag 3, the area shaping antenna 2 is located to the rear of the tag signal antenna 1.

The area shaping antenna 2 transmits reception area shaping signals based on the control of the transmission device 53. The reception area shaping signals are signals that narrow the area in which is located the RFID tag 3 that transmits a tag signal receivable by the tag signal antenna 1. In other words, the reception area shaping signals are signals for limiting the area in which is located the RFID tag 3 capable of satisfactorily transmitting and receiving a tag signal to/from the tag signal antenna 1.

The area shaping antenna 2 transmits, for example, a wireless signal in the same frequency band as the tag signal antenna 1. For example, the area shaping antenna 2 transmits a 920 MHz band wireless signal. In this case, the transmission device 53 performs wireless communication specified by IEEE 802.15.4g, which causes the area shaping antenna 2 to transmit a 920 MHz band wireless signal.

In the present embodiment, the reception area shaping signals transmitted by the area shaping antenna 2 are noise signals. This causes a reduction in the tag signal reception sensitivity in the tag signal antenna 1, and a reduction in the trigger signal reception sensitivity in the RFID tag 3. By causing a reduction in the reception accuracy such as these reception sensitivities, the communication area shaping antenna 2 limits the area in which is included the RFID tag 3 that is the source of the tag signal that can be accurately received by the tag signal antenna 1.

That is, the area shaping antenna 2 outputs, from behind the tag signal antenna 1, a noise signal for signals transmitted and received between the tag signal antenna 1 and the RFID tag 3. Thereby, the arrangement area of the RFID tags 3 capable of satisfactorily transmitting and receiving signals to/from the tag signal antenna 1 is limited on the basis of the carrier-to-noise ratio (C/N ratio).

The trigger signal transmitted by the tag signal antenna 1 is transmitted with an output giving rise to an electric field strength at which reception becomes favorable for the RFID tag 3 in a trigger signal reception area 11 (first reception area).

The reception area shaping signals transmitted by the area shaping antenna 2 are transmitted with an output giving rise to an electric field strength that affects the reception accuracy of the RFID tag 3 or the tag signal antenna 1 in a shaping signal reception area 21. The area shaping antenna 2 transmits reception area shaping signals so that at least the axis of the beam of the trigger signal overlaps the shaping signal reception area 21.

Due to the area shaping antenna 2 transmitting the reception area shaping signals, the range of the trigger signal reception area 11 including the RFID tag 3, which is the transmission source of the tag signal receivable by the tag signal antenna 1, narrows to the shaping area 12 shown in FIG. 1. That is, by the output of the reception area shaping signals as noise signals, the range of the trigger signal reception area 11 is narrowed to the range of the shaping area 12.

This enables the tag signal antenna 1 to transmit and receive signals to and from the RFID tags 3 located within the shaping area 12, whose area is narrowed as shown in FIG. 1. Thereby it is difficult for the tag signal antenna 1 to transmit and receive signals to and from the RFID tags 3 located outside the shaping area 12. In other words, even if located within the trigger signal reception area 11, it is difficult for the RFID tags 3 located outside the shaping area 12 to transmit and receive signals to and from the tag signal antenna 1 satisfactorily.

More specifically, the reception area shaping signals transmitted by the area shaping antenna 2 become noise signals, reach the RFID tag 3, and reach the tag signal antenna 1. Since the reception area shaping signals are blocked by the tag signal antenna 1, for those RFID tags 3 located in the area not reached by the direct waves of the reception area shaping signals, the effect of a decrease in the reception sensitivity due to the reception area shaping signals is reduced. In other words, for the RFID tags 3 located in the area where the influence of the reception area shaping signals is small, the degree of decrease in the reception sensitivity due to the noise signal is reduced.

However, for the tag signal antenna 1, the reception area shaping signals become a noise signal, and the reception sensitivity thereof is reduced. For this reason, the reception accuracy thereof to the tag signals transmitted by the RFID tags 3 at a far position in the trigger signal reception area 11 is deteriorated. That is, since the tag signal antenna 1 is affected by the reception area shaping signals, the reception sensitivity thereof to tag signals from distant RFID tags 3 is reduced.

For the RFID tags 3 located in the direct wave interference area reached by the direct waves of the reception area shaping signals, the direct waves of the reception area shaping signals become a noise signal. As a result, the RFID tags 3 located in the direct wave interference area cannot receive the signal from the tag signal antenna 1 satisfactorily, and so the possibility of transmitting the tag signal is reduced.

Thereby, the wireless tag system 100 can narrow the area including the RFID tags 3 that are the source of the tag signals receivable by the tag signal antenna 1 in the manner of the shaping area 12.

That is, in the field where the RFID tags 3 are arranged, the reception sensitivity of the RFID tags 3 increases in the shaping area 12, while the reception sensitivity decreases outside the shaping area 12.

In FIG. 1, signals transmitted from the tag signal antenna 1 and the area shaping antenna 2 have a central axis O. The central axis O is, for example, the central axis of the directivity of the tag signal antenna 1 and the area shaping antenna 2. The transmission directivity and the reception directivity of each antenna may be the same or different.

A side different from the central axis O across the broken line L1 and a side different from the central axis O across the broken line L2 in FIG. 1 are for convenience of description referred to as direct wave interference areas which are reached by direct waves of the reception area shaping signals. That is, the region to the outside of the broken line L1 with respect to the central axis O and the region to the outside of the broken line L2 with respect to the central axis O are referred to as direct wave interference regions, respectively.

In FIG. 1, the region on the central axis O side across the broken line L1 and the region on the central axis O side across the broken line L2 are diffracted wave interference regions reached by diffracted waves of the reception area shaping signals. That is, the region inside the broken line L1 with respect to the central axis O and the region inside the broken line L2 with respect to the central axis O are each referred to as a diffracted wave interference region. In the diffracted wave interference region, the reception area shaping signals become a noise signal, whereby the reception accuracy of the tag signal antenna 1 and the reception accuracy of the RFID tags 3 are reduced. Thereby, the shaping area 12 is shaped into a narrow area that is to the tag signal antenna 1 and closer to the center axis O with respect to the outer edge of the trigger signal reception area 11. In other words, the shaping area 12 is an area limited to an area where the effect due to the reception area shaping signals is small, within the trigger signal reception area 11.

The area shaping antenna 2 according to the present embodiment may be configured and arranged so as to cause a reduction in the reception accuracy of at least one of a reduction in the reception accuracy of the trigger signal of the RFID tag 3 on the basis of the reception area shaping signals becoming noise signals and a reduction in the reception accuracy in the tag signal antenna 1 of the tag signal on the basis of the reception area shaping signals becoming noise signals. The area shaping antenna 2 is configured and arranged so as to bring about any reduction in reception accuracy in this way. Doing so limits the area in which is positioned the RFID tags 3, the transmission sources of the tag signals, that can transmit and receive signals with the tag signal antenna 1 satisfactorily. That is, arranging the area shaping antenna 2 behind the tag signal antenna 1 can limit the area in which is positioned the RFID tags 3 that can satisfactorily transmit and receive signals to and from the tag signal antenna 1.

Figure 2:
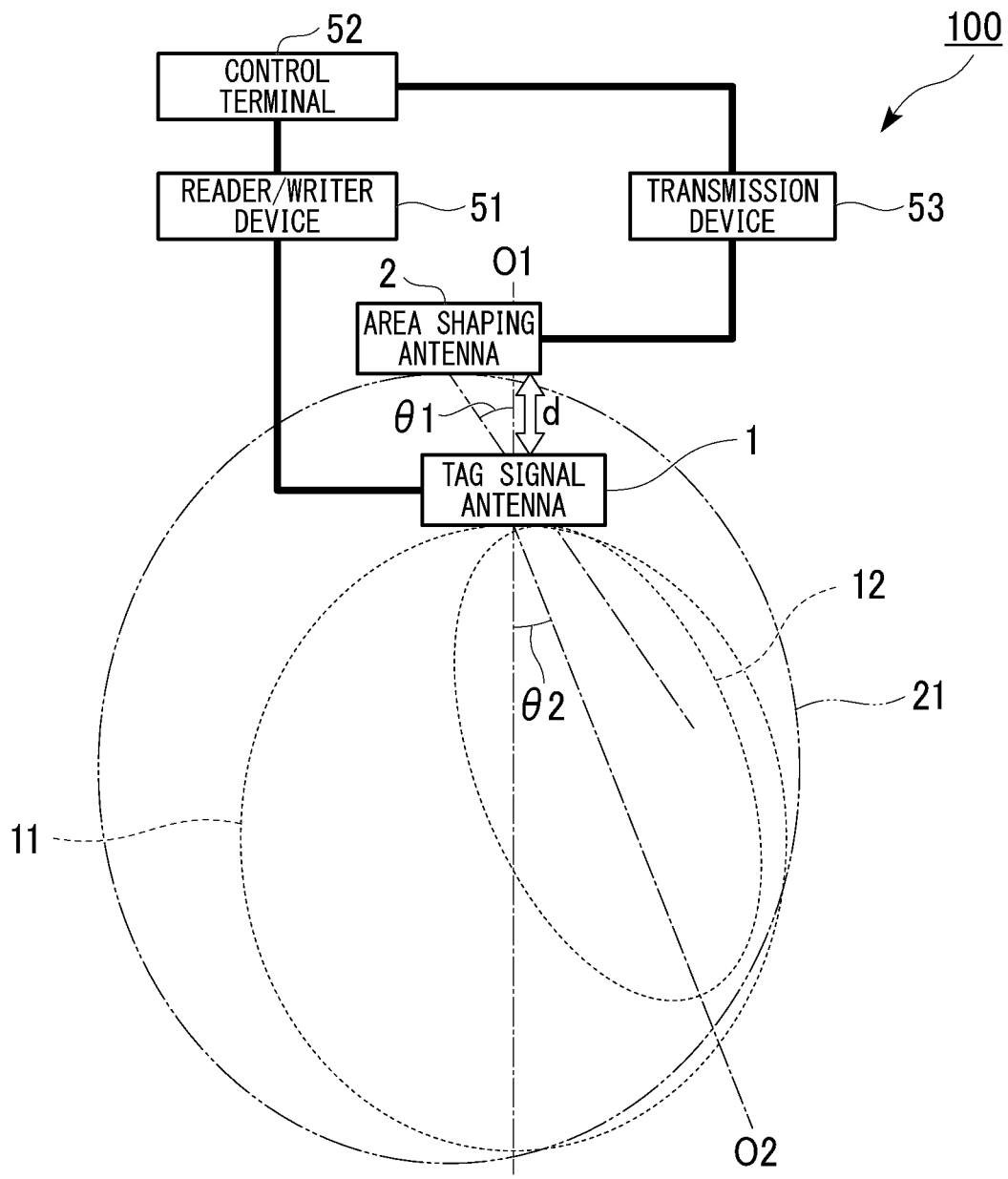
FIG. 2 is a second drawing illustrating a configuration of the wireless tag system according to one embodiment of the present invention.

FIG. 2 is a second diagram illustrating the configuration of the wireless tag system according to the embodiment.

Here, the distance d between the tag signal antenna 1 and the area shaping antenna 2 and the position of the area shaping antenna 2 installed opposite to the RFID tags 3 based on the position of the tag signal antenna 1 are adjusted. Thereby, the shape of the shaping area 12 based on the position of the tag signal antenna 1 can be changed. On the basis of one or both of the distance d between the tag signal antenna 1 and the area shaping antenna 2 or the angle θ1 between a straight line connecting the tag signal antenna 1 and the area shaping antenna 2 and the center axis O1, the range (shape, position, size) of the shaping area 12 can be determined.

Specifically, by increasing the length of the distance d, the influence of the electric field strength of the reception area shaping signals in the trigger signal reception area 11 is reduced. For this reason, the distance to the end position of the shaping area 12 from the tag signal antenna 1 increases.

Also, an example is shown in which the angle θ1 between the straight line connecting the tag signal antenna 1 and the area shaping antenna 2 and the center axis O1 increases. In this case, the beam axis of the radio wave of the trigger signal (the axis O2 forming θ2 with the center axis O1 in FIG. 2) is deformed so as to be inclined in the linear direction connecting the two antennas. That is, by shifting the position of the area shaping antenna 2 with respect to the tag signal antenna 1, the range and direction of the shaping area 12 can be adjusted.

The control terminal 52 may calculate the inter-antenna distance d and the angle θ1 using information such as a first transmission output value Ptx1, a second transmission output value Ptx2, and a reception power Prx of the tag signal antenna 1. The first transmission output value Ptx1 is the transmission output value specified by the reader/writer device 51 during transmission of the trigger signal by the tag signal antenna 1. That is, the first transmission output value Ptx1 is the transmission output value of the trigger signal by the tag signal antenna 1. The second transmission output value Ptx2 is the transmission output value specified by the transmission device 53 during transmission of the reception area shaping signals by the area shaping antenna 2. That is, the second transmission output value Ptx2 is the transmission output value of the reception area shaping signals by the area shaping antenna 2.

The control terminal 52 outputs an inter-antenna distance d and the angle θ (θ1, θ2) to a monitor or the like to enable viewing by an administrator. The administrator may arrange the tag signal antenna 1 and the area shaping antenna 2 using the information that has been output. The administrator adjusts the range of the shaping area 12 while adjusting the distance d and the angle θ.

For example, the control terminal 52 detects a carrier-to-noise ratio (C/N ratio) in the tag signal antenna 1. Then, the C/N ratio and the following parameters are substituted into an equation representing the relationship between the parameters, and the inter-antenna distance d and the angle θ are calculated. The parameters are, for example, a reception power Prx1 in the tag signal antenna 1, the first transmission output value Ptx1, the second transmission output value Ptx2, the inter-antenna distance d, the angle θ, the distance between the tag signal antenna 1 and the RFID tag 3, an output power Ptx3 of the tag signal of the RFID tag 3 and a reception power Prx2 of the tag signal. As described above, the position, the shape, and the size of the shaping region 12 can be changed while changing the parameters on the basis of the signal-to-noise ratio of the modulation signal. For example, the control terminal 52 can calculate the inter-antenna distance d and the angle θ that realize the desired shaping area 12 by performing a simulation using the parameters.

Figure 3:
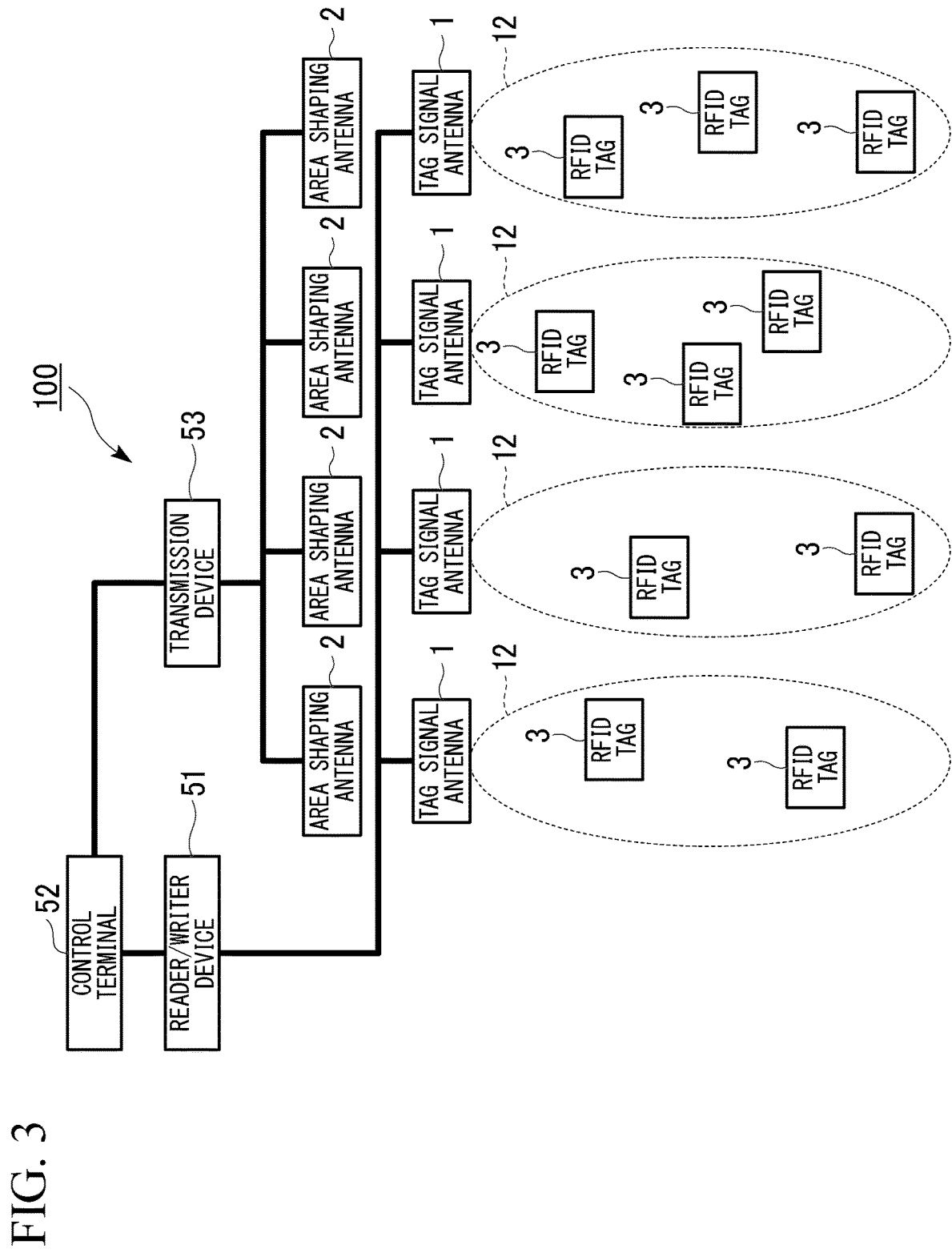
FIG. 3 is a third drawing illustrating the configuration of the wireless tag system according to one embodiment of the present invention.

FIG. 3 is a third diagram showing the configuration of the wireless tag system according to the embodiment.

The wireless tag system 100 may as shown in FIG. 3 be provided with a plurality of tag signal antennas 1 and a plurality of area shaping antennas 2 corresponding respectively to the tag signal antennas 1. With the combination of the tag signal antennas 1 and the corresponding area shaping antennas 2 arranged as described above, it is possible to adjust each shaping area 12 based on the trigger signal reception area 11 corresponding to each tag signal antenna 1 so that the tag signal transmitted from the RFID tag 3 at a desired position can be received.

Next, the processing flow of the control terminal 52 will be described step by step.

Upon a control start being instructed from the user, the control terminal 52 outputs an activation signal to the reader/writer device 51 and the transmission device 53. The reader/writer device 51 and the transmission device 53 are activated. The control terminal 52 detects information reading timing stored in the RFID tag 3. The control terminal 52 may detect the timing on the basis of a user operation, for example, or may automatically detect a predetermined timing.

The control terminal 52 notifies the reader/writer device 51 of the first transmission output value Ptx1, which is the transmission output of the trigger signal of the tag signal antenna 1. Note that the first transmission output value Ptx1 may be stored in the reader/writer device 51 or the tag signal antenna 1 in advance. Further, the control terminal 52 notifies the transmission device 53 of the second transmission output value Ptx2, which is the transmission output of the reception area shaping signals of the area shaping antenna 2. Note that the second transmission output value Ptx2 may be stored in the transmission device 53 or the area shaping antenna 2 in advance.

The reader/writer device 51 outputs the power of the first transmission output value Ptx1 to the tag signal antenna 1 and controls the transmission of the trigger signal from the tag signal antenna 1. The transmission device 53 outputs the power of the second transmission output value Ptx2 to the area shaping antenna 2, and controls the transmission of the reception area shaping signals from the area shaping antenna 2. Note that the transmission device 53 may always control the area shaping antenna 2 on the basis of the control of the control terminal 52 so that the reception area shaping signals are transmitted.

Thereby, an area in which transmission and reception are possible between the tag signal antenna 1 and the RFID tag 3 based on the trigger signal is formed in the manner of the shaping area 12. The tag signal antenna 1 receives the tag signal transmitted by the RFID tag 3 located in the shaping area 12, and the reader/writer device 51 reads the information included in the tag signal. When the signal output from the tag signal antenna 1 indicates a write instruction, the RFID tag 3 writes the information included in the signal to the storage unit.

According to the above-described wireless tag system 100, it is possible to limit the communicable area of the tag signal antenna 1 that reads a signal transmitted from the RFID tag 3 and transmits a signal to the RFID tag 3.

The above-described reader/writer device 51, the control terminal 52, and the transmission device 53 may be a computer provided with hardware such as a CPU (Central Processing Unit), ROM (Read Only Memory), RAM (Random Access Memory), an HDD (Hard Disk Drive), and a communication module.

The reader/writer device 51, the control terminal 52, and the transmission device 53 have a computer system inside. The processes of the above-described processes are stored in a computer-readable recording medium in the form of a program, and the computer reads and executes the program to perform the processes. Here, the computer-readable recording medium refers to a magnetic disk, a magneto-optical disk, a CD-ROM, a DVD-ROM, a semiconductor memory, or the like. Alternatively, the computer program may be distributed to a computer via a communication line, and the computer that has received the distribution may execute the program.

The program may be one for realizing some of the functions described above. Furthermore, the program may be a so-called differential file (differential program) that can realize the above-mentioned functions in combination with a program that has already been recorded in the computer system.

Priority is claimed on Japanese Patent Application No. 2018-010967, filed Jan. 25, 2018, the content of which is incorporated herein by reference.

INDUSTRIAL APPLICABILITY

According to this invention, it is possible to limit the reception area of a reader that reads a signal transmitted from a RFID tag.

REFERENCE SIGNS LIST

1: Tag signal antenna
2: Area shaping antenna
3: RFID tag
51: Reader/writer device
52: Control terminal
53: Transmission device

The invention claimed is:

1. A wireless tag system comprising:
a tag signal antenna configured to transmit a trigger signal that triggers transmission of a tag signal from a wireless transmission tag and receive the tag signal transmitted from the wireless transmission tag; and
a communication area shaping antenna configured to transmit a reception area shaping signal for narrowing an area in which the tag signal antenna can communicate with the wireless transmission tag,
wherein the communication area shaping antenna is disposed on a position in a direction opposite to a direction in which the tag signal antenna faces the wireless transmission tag when the tag signal antenna is used as a reference, and transmits from behind the tag signal antenna, the reception area shaping signal in a direction including an axial direction of the beam of the trigger signal transmitted by the tag signal antenna.

2. The wireless tag system according to claim 1, wherein the communication area shaping antenna transmits the reception area shaping signal as a noise signal of the trigger signal, and limits the area.

3. The wireless tag system according to claim 2, wherein the reception area shaping signal is a signal that reduce at least one of the reception sensitivity of the trigger signal in the wireless transmission tags and the reception sensitivity of the tag signal in the tag signal antenna.

4. A wireless communication area shaping method comprising:
transmitting, by a communication area shaping antenna, a reception area shaping signal for narrowing an area in which a tag signal antenna, which transmits a trigger signal that triggers transmission of a tag signal from a wireless transmission tag, can communicate with the wireless transmission tag; and
receiving, by the tag signal antenna, the tag signal transmitted from the wireless transmission tag positioned in the area,
wherein the communication area shaping antenna is disposed on a position in a direction opposite to a direction in which the tag signal antenna faces the wireless transmission tag when the tag signal antenna is used as a reference, and
in the transmitting of the reception area shaping signal, the reception area shaping signal is transmitted from behind the tag signal antenna, in a direction including an axial direction of the beam of the trigger signal transmitted by the tag signal antenna.

* * * * *